(12) United States Patent
Panchapakesan et al.

(10) Patent No.: US 11,824,989 B2
(45) Date of Patent: *Nov. 21, 2023

(54) SECURE ONBOARDING OF COMPUTING DEVICES USING BLOCKCHAIN

(71) Applicant: VMware, Inc., Palo Alto, CA (US)

(72) Inventors: Ramani Panchapakesan, Bangalore Karnataka (IN); Ramanandan Nambannor Kunnath, Banagalore Karnataka (IN); Erich Stuntebeck, Johns Creek, GA (US)

(73) Assignee: VMware, Inc., Palo Alto, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/350,310

(22) Filed: Jun. 17, 2021

(65) Prior Publication Data
US 2022/0407700 A1 Dec. 22, 2022

(51) Int. Cl.
| | | |
|---|---|---|
| *H04L 9/32* | (2006.01) | |
| *H04L 12/911* | (2013.01) | |
| *H04L 47/70* | (2022.01) | |
| *H04L 47/783* | (2022.01) | |
| *H04L 9/00* | (2022.01) | |

(52) U.S. Cl.
CPC .......... *H04L 9/3213* (2013.01); *H04L 9/3236* (2013.01); *H04L 47/783* (2013.01); *H04L 47/821* (2013.01); *H04L 47/828* (2013.01); *H04L 9/50* (2022.05)

(58) Field of Classification Search
CPC ... H04L 47/821; H04L 9/3236; H04L 9/3213; H04L 47/828; H04L 47/783; H04L 9/50
See application file for complete search history.

(56) References Cited

U.S. PATENT DOCUMENTS

| | | | |
|---|---|---|---|
| 10,693,633 B2 | 5/2020 | Kumar | |
| 10,783,600 B2 | 9/2020 | Zachary | |
| 11,165,781 B2 | 11/2021 | Infante-Lopez | |
| 11,337,070 B2* | 5/2022 | Heldt-Sheller | H04W 12/084 |
| 11,399,285 B2* | 7/2022 | Smith | H04W 12/35 |
| 11,522,702 B1* | 12/2022 | Panchapakesan | H04L 47/808 |
| 2014/0189799 A1 | 7/2014 | Lu | |
| 2015/0121470 A1 | 4/2015 | Rongo | |
| 2019/0349426 A1* | 11/2019 | Smith | H04L 67/1093 |
| 2020/0112563 A1* | 4/2020 | Ree | H04L 63/101 |
| 2020/0184739 A1 | 6/2020 | Nathan | |

* cited by examiner

*Primary Examiner* — Mohammad A Siddiqi
(74) *Attorney, Agent, or Firm* — Clayton, McKay & Bailey, PC (57) ABSTRACT

Systems and methods are described for onboarding a new device to a blockchain secured network. A trusted device that is already enrolled on the blockchain can receive information from a new device. The new device can send an onboarding request to a server through a non-blockchain secured Application Programming Interface ("API"). The trusted device can send an onboarding request for the new device through a blockchain secured API. The server can receive the requests and match them. The server can authenticate the two devices and send a request to a blockchain consensus to add the new device to the blockchain with the trusted device as a referral. The blockchain consensus can add the new device to the blockchain and notify the server. The server can notify the new device, and the new device can begin communicating through the blockchain secured API or directly with other devices on the blockchain.

20 Claims, 5 Drawing Sheets

SECURE ONBOARDING OF COMPUTING DEVICES USING BLOCKCHAIN

BACKGROUND

Enterprises networks are frequently under attack from unauthorized users attempting to break into the network and steal information, disrupt operations, and perform other malicious actions. These organizations are constantly looking for more advanced security options as hackers find ways to infiltrate networks.

Many organizations use public key infrastructure ("PKI") to protect confidential communication from one party to another within the organization. By using a two-key encryption system, PKI secures sensitive electronic information as it is passed back and forth between two parties. While PKI infrastructure can be an effective security measure, it has a single failure point that can compromise the entire network. If the certificate authority that issues the keys is compromised, then the malicious user can gain nearly unlimited access to the network.

As a result, a need exists for establishing trust between devices in a secure network that does not rely on a single entity.

SUMMARY

Examples described herein include systems and methods for onboarding computer devices to a blockchain secured network. In an example, a blockchain secured network can incorporate a blockchain ledger to establish two-way trust between devices that are part of the network. A trusted device that is already on the secured network can act as a referral for onboarding a new device. The method for onboarding the new device can depend on the functionality of the device.

In an example, the new device can be a user device that includes a management application associated with the secured network. The management application can prompt a user device to enter an onboarding mode, which can cause the user device to attempt to connect to a trusted device. A user can use the management application on the trusted device to enter a mode for onboarding a new device, which can cause the trusted device to attempt to connect to a new device. The two devices can connect to each other and exchange information. In one example, the management application on the user device can generate a unique session token and send it to the trusted device. The user device can also send other identity ("ID") information of the user device to the trusted device. Both devices can send an onboarding request to a server in a Unified Endpoint Management ("UEM") system. The user device can send the request through an Application Programming Interface ("API") that is not blockchain protected, and the trusted device can send the request through an API that is blockchain protected.

In an example, the UEM server can receive both requests and match them with each other to determine that they are both associated with onboarding the user device. In one example, the devices can also send authentication information to the UEM server, such as credentials or secure tokens. The UEM server can authenticate the devices. In one example, the UEM server can also verify and enforce compliance at the devices through the management applications. In an example, after authenticating the devices, the UEM server can send a request to a group of devices forming a blockchain consensus to add the user device to the blockchain. The blockchain consensus can add the user device to the blockchain and notify the UEM server. The UEM server can notify the user device through the non-blockchain protected API. The user device can reconfigure its communication protocols to communicate through the blockchain protected API.

In an example, all trusted devices in the blockchain secured network can have access to the blockchain ledger of the blockchain secured network. The devices can be configured to verify that any device that sends communications is on the blockchain ledger before receiving or processing the communication. The devices can also encrypt communications using encryption methods within the blockchain secured network for additional security. This can establish a two-way trust between all devices in the blockchain secured network.

In some examples, the new device does not include, or does not have the ability to include, the management application. For example, Internet of Things ("IoT") devices like cameras, edge nodes, and routers may not have the functionality to run a management application. For such devices, the trusted device can retrieve ID information from the IoT device and create a secure ID token for the device. The IoT device can be configured to send an onboarding request to the UEM server through an edge node that is not blockchain protected. In one example, the non-blockchain protected edge node can be a port on a blockchain protected edge node that is not protected. The trusted device can send an onboarding request for the IoT device along with the secure ID token and its own authentication information to the UEM server. The trusted device can send this information through a blockchain protected edge node or a blockchain protected API, in some examples.

In an example, the UEM server can receive the onboarding requests and match them to each other. This can include decrypting the secure ID token and matching it the ID provided by the IoT device. In one example, the UEM server can authenticate the trusted device and, in some examples, verify that the trusted device is compliant. The UEM server can send a request to a blockchain consensus to add the IoT device to the blockchain. The blockchain consensus can add the IoT device to the blockchain and notify the UEM server. The UEM server can notify the IoT device through the non-blockchain protected edge node. The UEM server can also provide instructions for communicating through a blockchain protected edge node. The IoT device can then reconfigure its communication protocols to communicate through the blockchain protected API.

In an example, the trusted device can be a staging device that is assigned to an administrator ("admin") device. The staging device can be used by someone that is not a part of the UEM system, such as a contractor. The admin device can provide the staging device with a shared credential. The staging device can onboard new IoT devices using the shared credential to authenticate. When the UEM system requests to add a new IoT device to the blockchain, the admin device can be designated a primary referral and the staging device can be designated a secondary referral.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for onboarding a new device to a blockchain secured network. A trusted device that is already enrolled on the blockchain can receive information from a new device. The new device can send an on boarding request to a server through a non-blockchain secured API. The trusted device can send an onboarding request for the new device through a blockchain secured API. The server can receive the requests and match them. The server can authenticate the two devices and send a request to a blockchain consensus to add the new device to the blockchain with the trusted device as a referral. The blockchain consensus can add the new device to the blockchain and notify the server. The server can notify the new device, and the new device can begin communicating through the blockchain secured API or directly with other devices on the blockchain.

Figure 1:
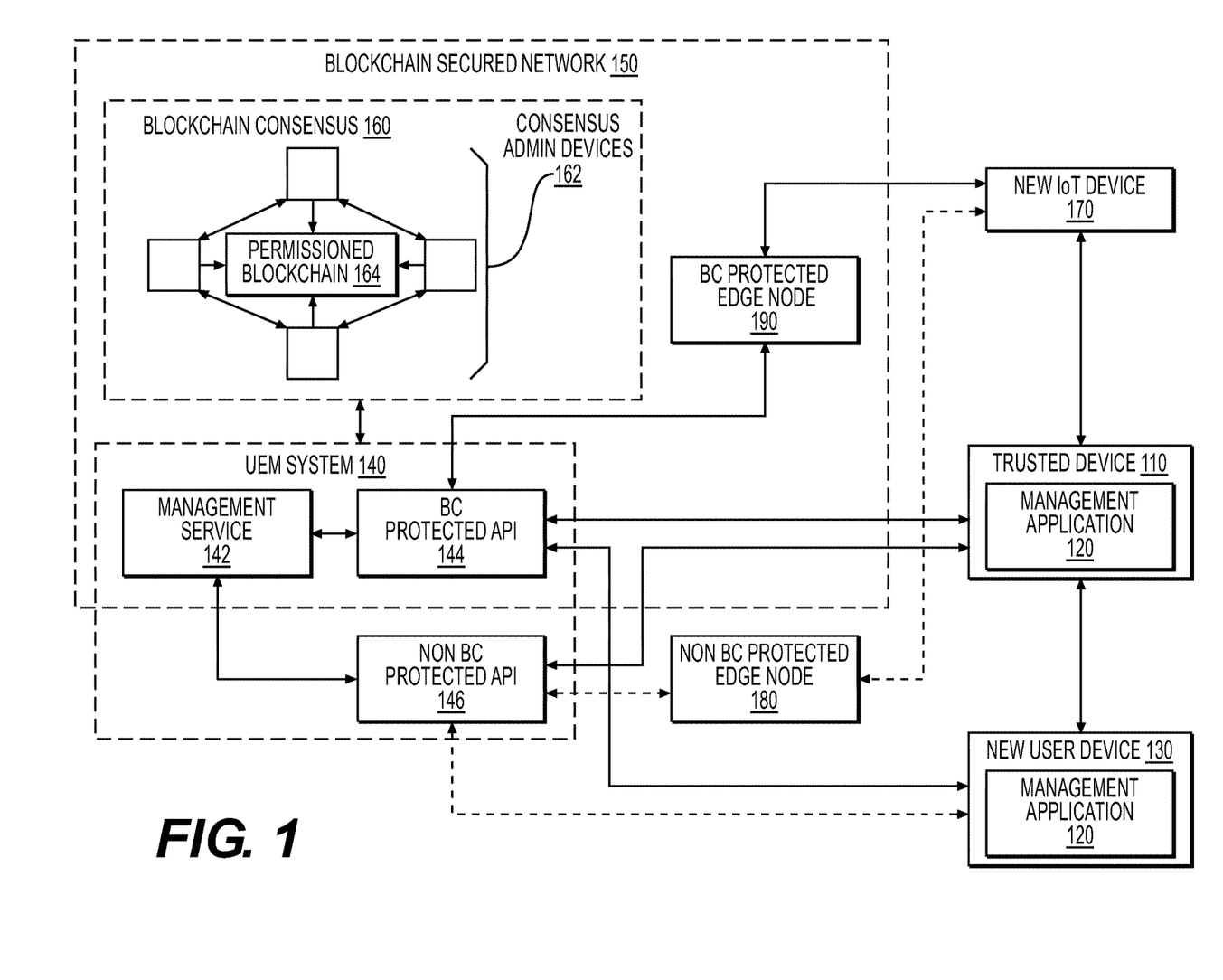
FIG. 1 is an illustration of a system for performing secure onboarding of computing devices.
Figure 2:
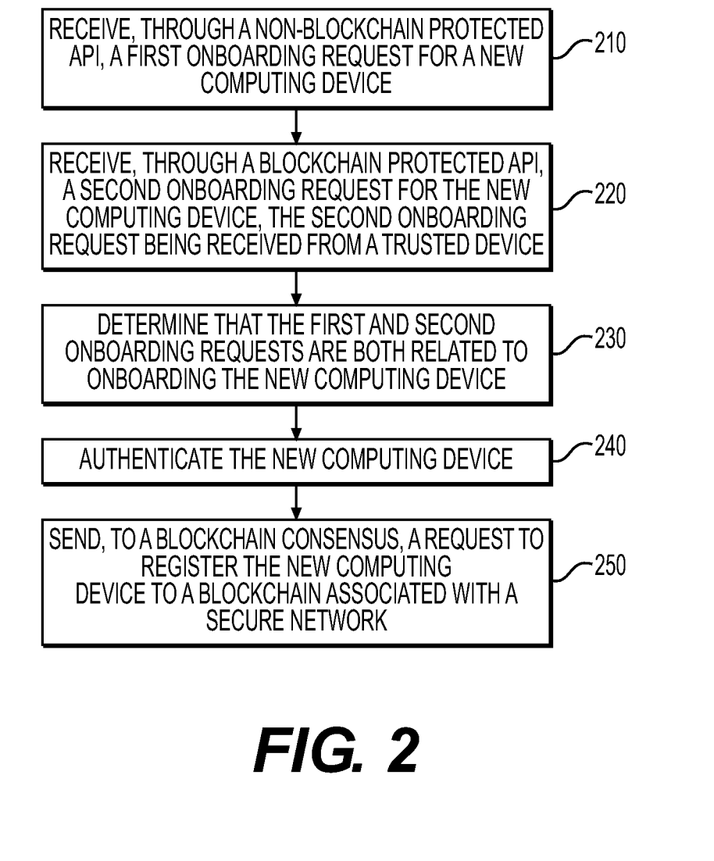
FIG. 2 is a flowchart of an example method for secure onboarding of a user device.
Figure 3:
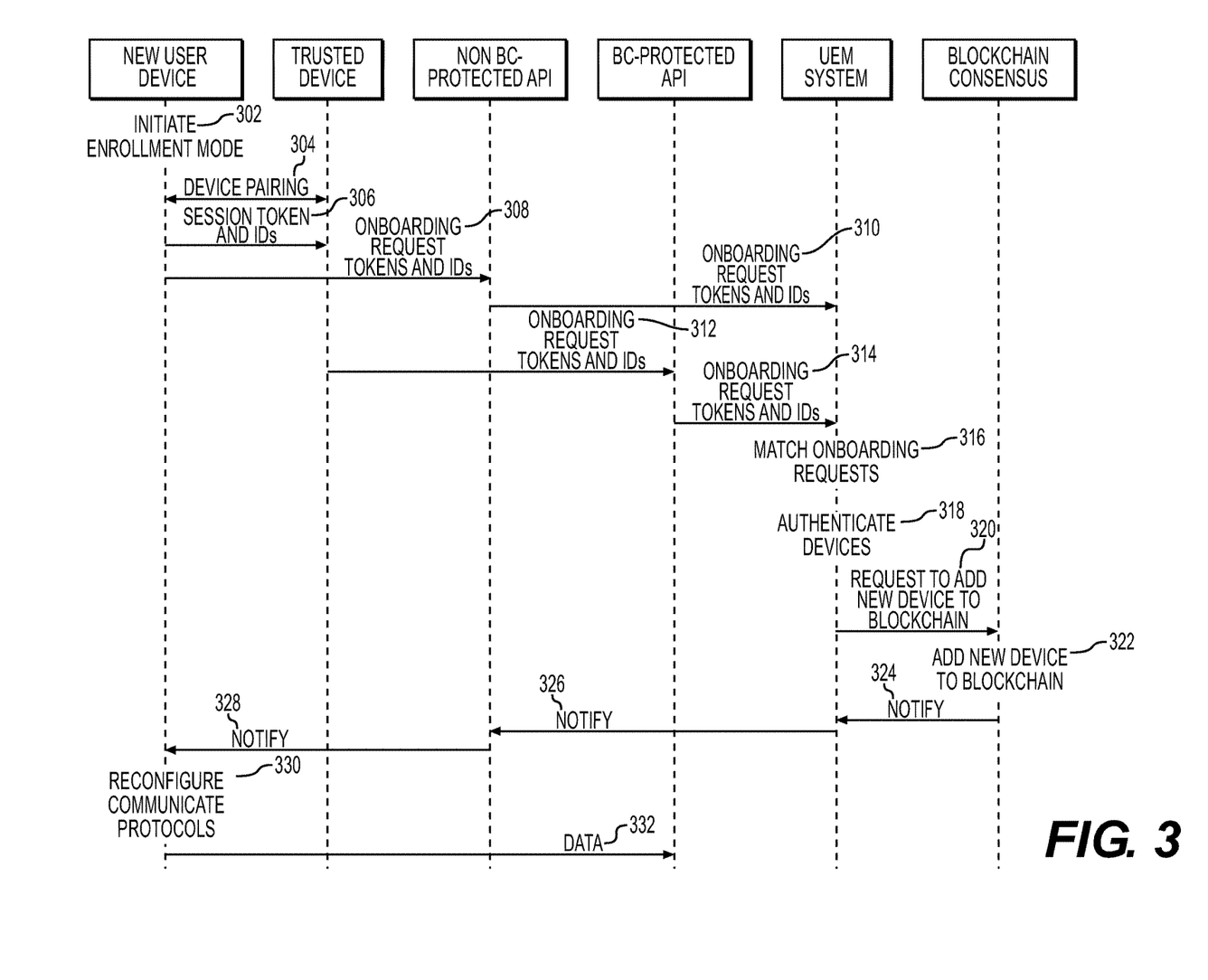
FIG. 3 is a sequence diagram of an example method for secure onboarding of a user device.
Figure 4:
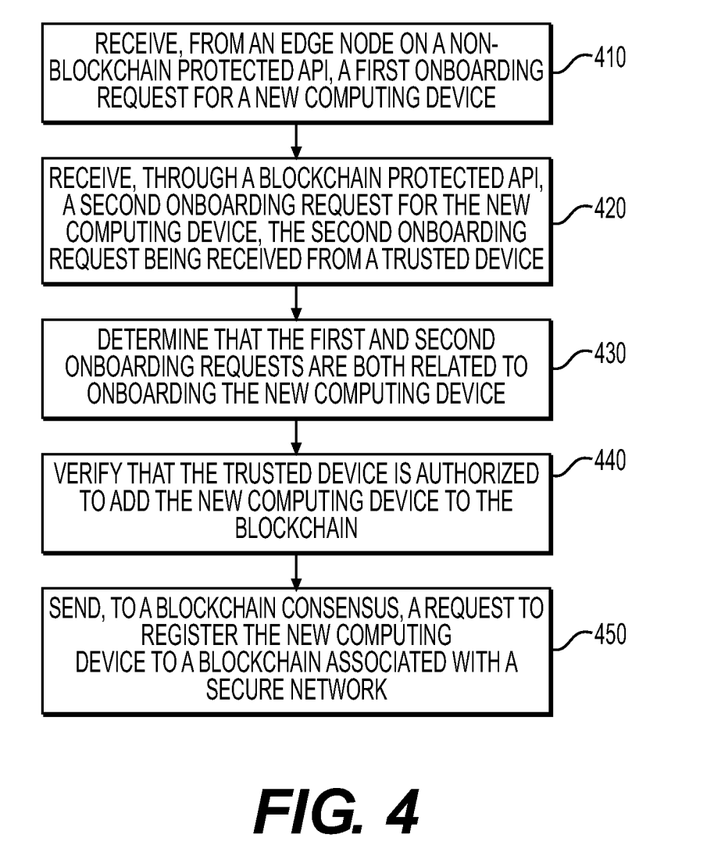
FIG. 4 is a flowchart of an example method for secure onboarding of an IoT device.
Figure 5:
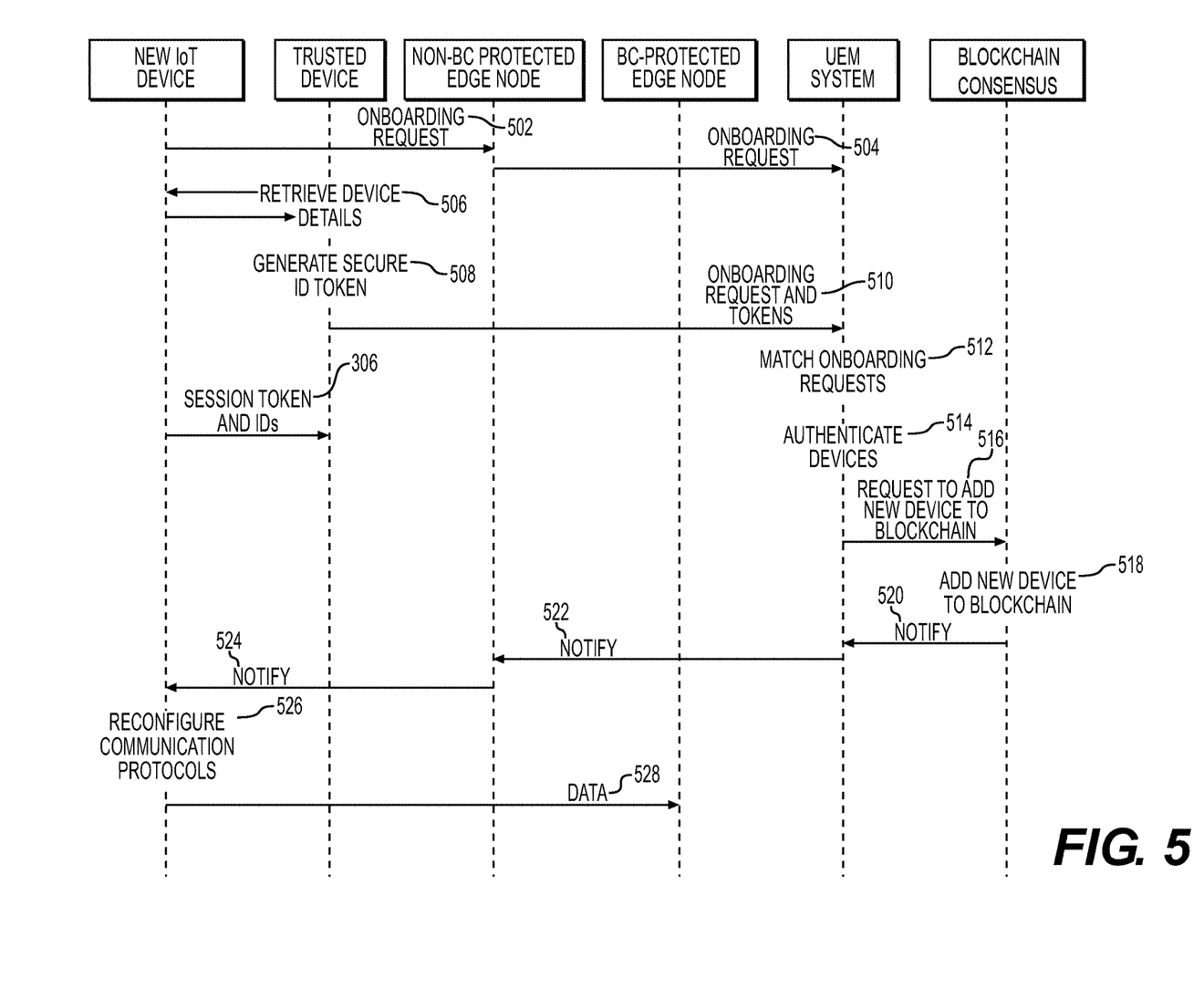
FIG. 5 is a sequence diagram of an example method for secure onboarding of an IoT device.

FIG. 1 is an illustration of a system for onboarding computing devices to a blockchain secure network. FIGS. 2 and 3 illustrate a flowchart and a sequence diagram, respectively, for onboarding a new user device to a blockchain secure network. FIGS. 4 and 5 illustrate a flowchart and a sequence diagram, respectively, for onboarding a new IoT device to a blockchain secure network.

FIG. 1 is an illustration of a system for performing secure onboarding of computing devices. The system can utilize a trusted device 110 for onboarding unknown devices, like a new user device 130 or a new IoT device 170, to a UEM system 140. The trusted device 110 and new user device 130 can be one or more processor-based devices, such as a personal computer, tablet, or cell phone. The new IoT device 170 can be one or more processor-based devices programmed to perform certain functions and be able to transmit data over a network. Some examples of the new IoT device 170 can includes sensors, cameras, routers, appliances, or machines. The UEM system 140 can be a single server or a group of servers, including multiple servers implemented virtually across multiple computing platforms.

In an example, the UEM system 140 can be a system for managing work-related applications and data on enrolled devices associated with an enterprise. Users can enroll their own devices, such as cell phones, tablets, or laptops. Enrollment can include installing managed applications and other resources on the user's device. The terms "enroll" and "onboard" are used interchangeably throughout this specification. In an example, the new user device 130 and the trusted device 110 can include a management application 120. The management application 120 can be a stand-alone application, part of an enterprise application, or part of an operating system of devices 110, 130. The UEM system 140 can include a management service 142 that manages and secures enrolled devices through the management application 120. For example, the management application 120 can be responsible for ensuring that devices are up to date with compliance and security settings prior to accessing data and resources associated with the UEM system 140. The management application 120 can enforce compliance at the devices 110, 130, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

In an example, the management application 120 can facilitate onboarding the new user device 130. For example, the management application 120 can have an option to enter an onboarding mode. When in an onboarding mode, the new user device 130 and attempt to connect to a trusted device. The management application 120 on the trusted device 110 can cause the trusted device 110 to attempt to connect to a new device. The new user device 130 and trusted device 110 can connect to each other using one or more of various methods. For example, the devices 110, 130 can connect via BLUETOOTH, WIFI, or using ultrasound or infrasound waves. In one example, the trusted device 110 can scan a barcode or QR code associated with the new user device 130, which can provide information for the trusted device 110 to connect directly to the user device 130 without requiring any type of scanning or device discovery. In an example, the devices 110, 130 can exchange onboarding information, such as unique IDs and tokens. The trusted device 110 can serve as a trusted referral for the new user device 130 during the onboarding process. The onboarding process of the new user device 130 is described in more detail later herein.

In an example, the trusted device 110 can also serve as a trusted referral for onboarding the new IoT device 170. Because the new IoT device 170 may not have the capability of executing the management application 120, the trusted device 110 can gather information about the new IoT device 170 to send to the UEM system 140 for enrollment. This information can be gathered by user input or scanning a barcode or QR code, as some examples. The onboarding process of the new IoT device 170 is described in more detail later herein.

In an example, the UEM system 140 can leverage a permissioned blockchain 164 to secure communications with and between enrolled devices. For example, the UEM system 140 can require that devices be registered on the permissioned blockchain 164 to be able to communicate with each other. Adding a device to the permissioned blockchain 164 can be part of the enrollment process. For example, the UEM system 140 can require that a device that is already registered to the permissioned blockchain 164, like the trusted device 110, attest the enrollment of the new devices like the new user device 130 and the new IoT device 170. After verifying the new device 130, 170, the UEM system 140 can send a request to a blockchain consensus 160 to add the new device 130, 170 to a permissioned blockchain

164. The blockchain consensus 160 can be comprised of consensus admin devices 162. For clarity, references to the blockchain consensus 160 herein can apply to one or more of the consensus admin devices 162 making up the blockchain consensus 160. The consensus admin devices 162 can be devices that are authorized to add other devices to the permissioned blockchain 164. Some examples of consensus admin devices 162 can include admin level devices and servers in the UEM system 140. In an example, requests to add a device to the permissioned blockchain 164 can go to all consensus admin devices 162 in the blockchain consensus 160. Each consensus admin device 162 can maintain a copy of the permissioned blockchain 164 ledger. In one example, devices on the permissioned blockchain 164 can query the blockchain consensus 160 when trying to verify that another device is on the permissioned blockchain 164. Alternatively, the blockchain consensus 160 can distribute the permissioned blockchain 164 or ledger (or both) to all devices on the permissioned blockchain 164 when there is a change or update. Each device can store its own copy of the ledger to know which other devices it can communicate with.

In an example, the permissioned blockchain 164 maintains the identity of each blockchain participant of a blockchain secured network 150 in a ledger. The permissioned blockchain 164 can also include an access layer used to control which devices can access the blockchain secured network 150. In one example, access to the blockchain secured network 150 and UEM resources can be restricted to devices on the permissioned blockchain 164. For example, if the new user device 130 attempts to access UEM resources before being added to the permissioned blockchain 164, the new user device 130 can be denied access even if it possesses a valid security token. As an example, the UEM system 140 can include a blockchain protected ("BC protected") API 144 and a non-BC protected API 146. The BC protected API 144 can be part of the permissioned blockchain 164 and allow devices on the permissioned blockchain 164 to access UEM resources. The UEM system 140 can limit access to resources for devices that communicate through the non-BC protected API 146. If the new user device 130 attempts to access UEM resources through the BC protected API 144, the UEM system 140 can check the permissioned blockchain 164 and determine that the new user device 130 is not on it. The UEM system 140 can deny access to the new user device 130 even if the new user device 130 provides a valid security token. In one example, the BC protected API 144 can reroute the new user device 130 to the non-BC protected API 146.

In a similar manner, the BC protected edge node 190 and a non-BC protected edge node 180 can utilize the permissioned blockchain 164 to manage access to the blockchain secured network 150. The edge nodes 180, 190 can be connection points in a network that facilitate communications between a network and external devices. Nodes can receive, send, create, or store data. In one example, the edge nodes 180, 190 can be part of the same physical device where the BC protected edge node 190 corresponds to a port on the device that is on the permissioned blockchain 164 and the non-BC protected edge node 180 corresponds to a port that is not. In an example, the BC protected edge node 190 can verify that any device that attempts to access the blockchain secured network 150 or the UEM system 140 are on the permissioned blockchain 164 before allowing access. Likewise, every device on the blockchain secured network 150 can be configured to verify that any other device that it receives a communication from is on the permissioned blockchain 164 before allowing the communication to proceed, even if the other device has a valid security token.

In an example, devices on the permissioned blockchain 164 can be restricted from directly exchanging UEM data and resources with devices not on the permissioned blockchain 164. In an example, this can be managed by the management application 120. For example, if the new user device 130, prior to being added to the permissioned blockchain 164, requests UEM data directly from the trusted device 110, the trusted device 110 can deny the request. However, once the new user device 130 is added to the permissioned blockchain 164, the trusted device 110 and new user device 130 can exchange security keys and securely exchange UEM-related data. For example, the permissioned blockchain 164 can be used jointly with encryption techniques, such as public key infrastructure ("PKI"), when devices directly communicate with each other. As an example, after verifying that the new device 130 is on the permissioned blockchain 164, the trusted device 110 can perform a Secure Sockets Layer ("SSL") or Transport Secure Layer ("TSL") handshake with the new user device 130 as an additional verification layer. Information can then be safely encrypted and passed between the two devices 110, 130.

In an example, every device in the blockchain secured network 150 can be considered a node, including, for example, edge devices like edge devices 180, 190. By doing this, every device in the blockchain secured network 150 can verify the trust of any device it communicates with. If a rogue device infiltrates the blockchain secured network 150, it will be stopped immediately because it is not registered to the permissioned blockchain 164. For example, if a rogue device attempts to access the blockchain secured network 150 through the BC protected edge node 190, the BC protected edge node 190 can deny the rogue device access after checking the permissioned blockchain 164. In one example, the BC protected edge node 190 can reroute any requests from devices not registered on the permissioned blockchain 164 to a non-BC protected edge node 180, which only has access to the non-BC protected API 146.

In an example, devices not on the permissioned blockchain 164, such as the new user device 130 or the new IoT device 170 before onboarding, can be configured to communicate with the UEM system 140 through a non-BC protected API 146. The configuration settings can be provided by the management application 120 or from a trusted device 110, for example. In FIG. 1, pre-onboarding communications for the new user device 130 and new IoT device 170 are represented by dotted lines with arrows. In one example, communications on the non-BC protected API 146 can be routed through a specific port on one or more servers of the UEM system 140. Devices that have been successfully onboarded, like the trusted device 110, can communicate with the UEM system 140 through a BC protected API 144. In FIG. 1, post-onboarding communications for the new user device 130 and new IoT device 170 are represented by solid lines leading to the BC protected API 144 and the BC protected edge node 190.

In an example, the UEM system 140 can include multiple permissioned blockchains 164. Each permissioned blockchain 164 can pertain to a different secured group. For example, one permissioned blockchain 164 can pertain to a particular data center and another permissioned blockchain 164 can pertain to a particular company or customer. Other examples of groups that can implement a permissioned blockchain 164 can include departments, employees that work at the same office or in the same geographic area, and devices for high level executives. Devices can be added to any applicable permissioned blockchains 164. In one example, the blockchain consensus 160 can manage all the permissioned blockchains 164 for the UEM system 140. Alternatively, a different blockchain consensus 160 can be used for each permissioned blockchain 164.

FIG. 2 is a flowchart of an example method for secure onboarding of a user device. At stage 210, the UEM system 140 can receive, through the non-BC protected API 146, a first onboarding request for the new user device 130. In an example, the first onboarding request can come from the new user device 130. For example, a user can launch the management application 120 on the new user device 130. The management application 120 can determine that the new user device 130 is not yet enrolled. For example, the management application 120 can check for a token provided to enrolled devices. The new user device 130 will not yet have such a token because it has not yet enrolled. Upon detecting that the new user device 130 is not enrolled, the management application 120 can enter an onboarding mode. In one example, the management application 120 can enter the onboarding mode in response to user input. The management application 120 can instruct the new user device 130 to enter a discovery mode. In the discovery mode, the new user device 130 can search for a trusted device to connect to, make itself discoverable by a trusted device, or both. Additionally, a user can enable an onboarding mode on the trusted device 110, also using the management application 120. The trusted device 110 can be already enrolled with the UEM system 140, and the onboarding mode for the trusted device 110 can cause the trusted device 110 to search for a new device, make itself discoverable to a new device, or both. As some examples, the two devices 110, 130 can use BLUETOOTH, WIFI, or ultrasound or infrasound waves to find each other and connect. In one example, the trusted device 110 can scan a barcode or QR code associated with the new user device 130, which can provide information for the trusted device 110 to connect directly to the user device 130 without requiring any other type of scanning or device discovery.

In an example, the management application 120 can restrict the devices 110, 130 from exchanging anything except for specific types of information before the new user device 130 is successfully enrolled. For example, upon connecting to the new user device 130, the trusted device 110 can determine that the new user device 130 is not registered on the permissioned blockchain 164. In one example, the trusted device 110 can check a local copy of the permissioned blockchain 164 that it received from the blockchain consensus 160. In another example, the trusted device 110 can query the blockchain consensus 160 for the status of the new user device 130 on the permissioned blockchain 164. In an example, because the new user device 130 is not on the permissioned blockchain 164, the trusted device 110 can be restricted to exchanging only information required for enrolling the new user device 130, such as IDs, tokens, and network information.

In an example, the management application 120 executing on the new user device 130 can generate a unique session token. The new user device 130 can send the unique session token to the trusted device 110 along with any unique device IDs of the new user device 130 required for enrollment. A session token can be encrypted string that reflects the session instance between the devices 110, 130. A device ID can be an ID that uniquely identifies the new user device 130, such as a model and serial number or an International Mobile Equipment Identity ("IMEI") number, as a few examples. In one example, the new user device 130 can encrypt the tokens and IDs before sending them to the trusted device 110.

In an example, the first onboarding request can come from the new user device 130 via the non-BC protected API 146. For example, the new user device 130 can send the onboarding request through the non-BC protected edge node 180, which can send the onboarding request to the UEM system 140 through the non-BC protected API 146. In one example, the management application 120 on the new user device 130 can be configured to connect to the non-BC protected edge node 180 before it has been enrolled. In an alternate example, the new user device 130 can receive the network information for sending the onboarding request from the trusted device 110. The onboarding request can include additional information associated with enrolling the new user device 130, such as the session token and the device ID.

At stage 220, the UEM system 140 can receive, through the BC protected API 144, a second onboarding request for the new user device 130. This request can come from the trusted device 110. In one example, the trusted device 110 can send a request to enroll the new user device 130 to the UEM server 140 through the BC protected edge node 190. The BC protected edge node 190 can be configured to only accept requests from devices on the permissioned blockchain 164. The BC protected edge node 190 can use the BC protected API 144 to send the onboarding request to the UEM system 140. In one example, the UEM system 140 can also verify that the BC protected edge node 190 is on the permissioned blockchain 164 before processing the request. Likewise, any device that handles the second onboarding request can check whether the device it receives the request from is on the permissioned blockchain 164. This can verify to the UEM system 140 that the second onboarding request originated from a trusted device that is on the permissioned blockchain 164.

In an example, the second onboarding request can include the session token provided by the new user device 130 and the unique ID of the new user device 130. In an example, the trusted device 110 can also send its own secure token and a secondary session token. The secure token and secondary session token can be used by the UEM system 140 to authenticate the trusted device 110.

At stage 230, the UEM system 140 can determine that the first and second onboarding requests are both related to onboarding the new user device 130. For example, the UEM system 140 can identify the session token as being associated with enrolling a new device. The UEM system 140 can use the session token from the second onboarding request to locate a matching session token received through the non-BC protected API 146. For example, the UEM system 140 can match the session token of the second onboarding request to the session token of the first onboarding request.

At stage 240, the UEM system 140 can authenticate the new user device 130. For example, a user can enter credentials into the management application 120 of the new user device 130. The new user device 130 can send the credentials to the UEM system 140 through the non-BC protected API 146. The UEM system 140 can then attempt to authenticate the new user device 130. Even where authentication is successful, the new user device 130 can still be restricted to the non-BC protected API 146 until the new user device 130 is added to the permissioned blockchain 164.

In an example, authentication can include checking the compliance of the new user device 130. For example, the management application 120 on the new user device 130 can gather information about the new user device 130, such as security settings, installed applications, and its network connection. The management application 120 can send this information to the UEM system 140, and the UEM system 140 can ensure that the new user device 130 is compliant before allowing the new user device 130 to enroll. In one example, the UEM system 140 can also verify compliance of the trusted device 110 as well.

At stage 250, the UEM system 140 can send, to the blockchain consensus 160, a request to register the new user device 130 to the permissioned blockchain 164. In an example, the request can identify the trusted device 110 as a trusted referral. The UEM system 140 can also send details about the new user device 130, such as the device ID, any groups the associated user belongs to, and the geolocation of the new user device 130.

In an example, the UEM system 140 can send the request to one or all of the consensus admin devices 162. In one example, the UEM system 140 can send the request to a server node that distributes the request to the consensus admin devices 162. In another example, the server node can include a consensus engine that selects one of the consensus admin devices 162 to approve the request. Upon approval, the selected consensus admin device 162 or the server node can notify the remaining consensus admin devices 162, and the consensus admin devices 162 can add the new user device 130 to the permissioned blockchain 164.

In an example, secured devices that are on the permissioned blockchain 164 can have access to view other devices that are also on the permissioned blockchain 164, such as by viewing the devices listed on the ledger. If a first device attempts to connect a second device, the first device can retrieve ID information from the second device and compare it to the permissioned blockchain 164. If the second device's ID is on the permissioned blockchain 164, then the first device can know that the second device is a trusted device, and they can establish two-way trust. In one example, the blockchain trust can be combined with other forms of verification, such as by exchanging public keys and secure tokens.

In an example, the blockchain consensus 160 can notify the UEM system 140 that the new user device 130 was added to the permissioned blockchain 164. The UEM system 140 can notify the new user device 130 and instruct it to communicate through the BC protected API 144.

FIG. 3 is a sequence diagram of an example method for secure onboarding of a user device. At stage 302, the new user device 130 can initiate an enrollment mode. When in an enrollment mode, the new user device 130 can attempt to connect to a trusted device 110. The management application 120 on the trusted device 110 can also cause the trusted device 110 to attempt to connect to a new device.

At stage 304, the new user device 130 and the trusted device 110 can connect to each other using one or more of various methods. For example, the devices 110, 130 can connect via BLUETOOTH, WIFI, or using ultrasound or infrasound waves. In one example, the trusted device 110 can scan a barcode or QR code associated with the new user device 130, which can provide information for the trusted device 110 to connect directly to the user device 130 without requiring any type of other scanning or device discovery.

At stage 306, the new user device 130 can send a session token and ID information to the trusted device 110. For example, the management application 120 on the new user device 130 can generate a unique session token and send it to the trusted device 110. The new user device 130 can also send any information that uniquely IDs the new user device 130, such as model and serial number or an IMEI number.

In one example, the new user device 130 can encrypt the tokens and IDs before sending them to the trusted device 110.

At stage 308, the new user device 130 can send a first onboarding request, which can include or accompany the unique session token and the ID information, to the non-BC protected API 146. For example, the management application 120 can configure the new user device 130 to communicate with the UEM system 140 through the non-BC protected API 146 when it is not enrolled. In an example, if the new user device 130 attempts to send the first onboarding request through the BC protected API 144, the API 144 can redirect the new user device 130 to the non-BC protected API 146. At stage 310, the non-BC protected API 146 can send the first onboarding request, the unique session token, and the ID information to the UEM system 140.

At stage 312, the trusted device 110 can send a second onboarding request, tokens, and IDs to the BC-protected API 144. In one example, the tokens can include the unique session token from the first user device 130. The trusted device 110 can also send its own secure token and a secondary session token that the UEM system 140 can use to authenticate the trusted device 110. In one example, the IDs can include the ID of the new user device 130.

In an example, the BC-protected API 144 can be configured to only accept requests from devices that are on the permissioned blockchain 164. The BC-protected API 144 can first check the permissioned blockchain 164 to verify the trusted device 110, and then send the second onboarding request, tokens, and IDs to the UEM system 140 at stage 314. The BC-protected API 144 can check the permissioned blockchain 164 by obtaining a current copy of the ledger for the permissioned blockchain 164, which the consensus admin devices 162 agree is current and correct. The ledger can be stored at the UEM system 140 or obtained from one or more admin devices 162 for example.

At stage 316, the UEM system 140 can match the onboarding requests. For example, the UEM system 140 can identify the session token as being associated with enrolling a new device. The UEM system 140 can use the session token from the second onboarding request to locate a matching session token received through the non-BC protected API 146. For example, the UEM system 140 can match the session token of the second onboarding request to the session token of the first onboarding request.

At stage 318, the UEM system 140 can authenticate the devices 110, 130. For example, a user can enter credentials into the management application 120 of the new user device 130. The new user device 130 can send the credentials to the UEM system 140 through the non-BC protected API 146. The UEM system 140 can then attempt to authenticate the new user device 130. Even where authentication is successful, the new user device 130 can still be restricted to the non-BC protected API 146 until the new user device 130 is added to the permissioned blockchain 164. In one example, the UEM system 140 can authenticate the trusted device using the secure token and secondary session token.

In an example, authentication can include checking the compliance of the new user device 130. For example, the management application 120 on the new user device 130 can gather information about the new user device 130, such as security settings, installed applications, and its network connection. The management application 120 can send this information to the UEM system 140, and the UEM system 140 can ensure that the new user device 130 is compliant before allowing the new user device 130 to enroll. In one example, the UEM system 140 can also verify compliance of the trusted device 110 as well.

At stage 320, the UEM system 140 can send a request to the blockchain consensus 160 to add the new user device 130 to the permissioned blockchain 164. In one example, the request can name the trusted device 110 as a trusted referral. The UEM system 140 can also send details about the new user device 130, such as the device ID, any groups the associated user belongs to, and the geolocation of the new user device 130.

At stage 322, the blockchain consensus 160 can add the new user device 130 to the permissioned blockchain 164. In an example, the blockchain consensus 160 can include a consensus engine that can receive the request and select a consensus admin device 162 to approve the request. The selected consensus admin device 162 can approve the request, and the new user device 130 can be added to the blockchain. In one example, the UEM system 140 can send the request directly to the admin devices 162, either directly or through a network node that receives the request and forwards it to the admin devices 162. The admin devices 162 can add the new user device 130 to the permissioned blockchain 164. Each of the admin devices 162 can maintain the ledger so that its authenticity and veracity are decentralized.

At stage 324, the blockchain consensus 160 can notify the UEM system 140 that the new user device 130 was added to the permissioned blockchain 164. The UEM system 140 can then send the notification to the non-BC protected API 146 at stage 326, which can forward the notification to the new user device 130 at stage 328.

At stage 330, the new user device 130 can reconfigure its communication protocols to communicate with the UEM system 140 through the BC-protected API 144. This can be performed by the management application 120, in an example. In one example, the notification can include network information for connecting to the BC-protected API 144. At stage 332, the new user device 130 can communicate through the BC-protected API 144. In one example, the BC-protected API 144, upon receiving a communication request from the new user device 130, can verify that the new user device 130 is on the permissioned blockchain 164 before allowing the request to pass through.

FIG. 4 is a flowchart of an example method for secure onboarding of an IoT device. At stage 410, the UEM system 140 can receive, from the non-BC protected edge node 180, a first onboarding request for the new IoT device 170. In an example, the first onboarding request can come from the new IoT device 170. For example, the trusted device 110 can be an admin device that is authorized to configure IoT devices on the blockchain secured network 150. The trusted device 110 can connect to the new IoT device 170, such as with BLUETOOTH, WIFI, or using ultrasound or infrasound waves, and configure the new IoT device 170 to connect the non-BC protected edge node 180. In one example, the new IoT device 170 can be programmed to connect to the non-BC protected edge node 180 as part of a staging process.

At stage 420, the UEM system 140 can receive, from the BC-protected API 144, a second onboarding request for the new IoT device 170. This request can come from the trusted device 110. In one example, the trusted device 110 can send a request to enroll the new IoT device 170 to the UEM server 140 through the BC protected edge node 190. The BC protected edge node 190 can be configured to only accept requests from devices on the permissioned blockchain 164. For example, the BC protected edge node 190 can obtain a current copy of the ledger for the permissioned blockchain 164, which the consensus admin devices 162 agree is current and correct. The BC protected edge node 190 can use the BC protected API 144 to send the onboarding request to the UEM system 140. In one example, the UEM system 140 can also verify that the BC protected edge node 190 is on the permissioned blockchain 164 before processing the request. Likewise, any device that handles the second onboarding request can check whether the device it receives the request from is on the permissioned blockchain 164. This can verify to the UEM system 140 that the second onboarding request originated from a trusted device that is on the permissioned blockchain 164.

In an example, the second onboarding request can include the session token provided by the new IoT device 170 and the unique ID of the new IoT device 170. In an example, the trusted device 110 can also send its own secure token and a secondary session token. The secure token and secondary session token can be used by the UEM system 140 to authenticate the trusted device 110.

In an example, the trusted device 110 can generate a secure ID token for the new IoT device 170. The secure ID token can include an ID that uniquely identifies the new IoT device 170, such as a serial and model number, a media access control ("MAC") address, or other identifying information. In an example, the management application 120 on the trusted device 110 can use the uniquely identifiable data to generate the secure ID token. The trusted device 110 can send the second onboarding request with the secure ID token to the UEM system 140 via the BC protected API 144. In one example, the BC protected API 144 can verify that the trusted device 110 is on the permissioned blockchain 164 before receiving and passing on the onboarding request and information.

At stage 430, the UEM system 140 can determine that the first and second onboarding requests are both related to onboarding the new IoT device 170. For example, the UEM system 140 can identify the secure ID token as being associated with enrolling a new IoT device 170. In one example, the UEM system 140 can use the secure ID token from the second onboarding request to locate a matching ID received through the non-BC protected API 146. For example, the UEM system 140 can match the secure ID token of the second onboarding request to an ID provided by the new IoT device 170 in the first onboarding request.

At stage 440, the UEM system 140 can verify that the trusted device 110 is authorized to add the new IoT device 170 to the permissioned blockchain 164. For example, the trusted device 110 can send its own secure token and a session token with the second onboarding request. The UEM system 140 can verify the tokens and ensure that the trusted device 110 is on the permissioned blockchain 164. In one example, the UEM system 140 can also check the roles of a user associated with the trusted device 110 to ensure that the user is authorized to add new IoT devices.

In an example, verification can include checking the compliance of the trusted device 110. For example, the management application 120 on the trusted device 110 can gather information about the trusted device 110, such as security settings, installed applications, and its network connection. The management application 120 can send this information to the UEM system 140, and the UEM system 140 can determine whether the trusted device 110 is authorized to add an IoT device 170 based on this information. For example, if the trusted device 110 is outside an authorized geolocation area, or is not physically near the new IoT device 170, the UEM system 140 deny the onboarding request.

At stage 450, the UEM system 140 can send, to the blockchain consensus 160, a request to register the new IoT device 170 to the permissioned blockchain 164. In one example, the request can identify the trusted device 110 as a trusted referral. The UEM system 140 can also send details about the new IoT device 170, such as the device ID and its geolocation.

In an example, the UEM system 140 can send the request to one or all of the consensus admin devices 162. In one example, the UEM system 140 can send the request to a server node that distributes the request to the consensus admin devices 162. In another example, the server node can include a consensus engine that selects one of the consensus admin devices 162 to approve the request. Upon approval, the selected consensus admin device 162 or the server node can notify the remaining consensus admin devices 162, and the consensus admin devices 162 can add the new IoT device 170 to the permissioned blockchain 164.

In an example, the blockchain consensus 160 can notify the UEM system 140 that the new IoT device 170 was added to the permissioned blockchain 164. The UEM system 140 can notify the new IoT device 170 and instruct it to communicate through the BC protected API 144.

In one example of the method described above, the trusted device 110 can be a staging device that is not associated with an authorized user. For example, the trusted device 110 can be a staging device used by a contractor to install the new IoT devices 170 on the blockchain secured network 150. In such an example, the staging device can be assigned to an admin user device. The admin device can generate a shared user credential that the staging device can use to onboard IoT devices 170. In an example, the UEM system 140 can be configured to not allow the staging device to onboard a new IoT device 170 without a referral from an assigned admin device. In one example, the admin device can provide the shared user credential, and any other authentication or security information, to the staging device. The staging device can send this information to the UEM system 140 when adding a new IoT device 170. The UEM system 140 can authenticate the staging device, verify that it is compliant, and verify the assigned admin device. If this is successful, the UEM system can send a request to add the new IoT device 170 to the blockchain consensus 160 with the admin device as a primary referral and the staging device as a secondary referral. This can allow third-party users, like contractors, to securely add IoT devices to the blockchain secured network 150.

FIG. 5 is a sequence diagram of an example method for secure onboarding of an IoT device. At stage 502, the new IoT device 170 can send a first onboarding request to the non-BC protected edge node 180. In one example, the new IoT device 170 can be configured to connect to the non-BC protected edge node 180 by the trusted device 110 or another device during a staging process. At stage 504, the non-BC protected edge node 180 can send the first onboarding request to the UEM system 140.

At stage 506, the trusted device 110 can retrieve details about the new IoT device 170. The details can be input by a user, in one example. In an alternative example, the trusted device 110 can scan the new IoT device 170 to obtain the details. For example, the trusted device 110 can scan a barcode or QR code, or it can take a picture of identifying information on the new IoT device 170 and use image processing to identify alphanumeric characters. In one example, the details can include a unique identifier of the new IoT device 170, such as a model and serial number or other identifying information.

At stage 508, the trusted device 110 can generate a secure ID token based on a unique ID of the new IoT device 170. In one example, the secure ID token can be a data file that includes unique ID information about the new IoT device 170. The trusted device 110 can encrypt the data file using an encryption method like PKI, a hash, or a cryptographic hash.

At stage 510, the trusted device 110 can send a second onboarding request and the secure ID token to the UEM system 140. In one example, the trusted device 110 can also send its own secure token and session token that the UEM system 140 can use to authenticate the trusted device 110. In one example, the trusted device 110 can send the onboarding request and the secure ID token through the BC protected API 144. The BC-protected API 144 can be configured to only accept requests from devices that are on the permissioned blockchain 164. The BC-protected API 144 can first check the permissioned blockchain 164 to verify the trusted device 110, and then send the second onboarding request and secure ID token to the UEM system 140 at stage 314.

At stage 512, the UEM system 140 can match the onboarding requests. For example, the UEM system 140 can decrypt the secure ID token to obtain the unique ID of the new IoT device 170. The UEM system 140 can use then use the unique ID to locate a matching onboarding request with the same ID. For example, the UEM system 140 can match the decrypted ID of the second onboarding request to the ID provided in the first onboarding request.

At stage 514, the UEM system 140 can authenticate the trusted device 110. This can include verifying that the trusted device 110 is authorized to add the new IoT device 170 to the permissioned blockchain 164. For example, the UEM system 140 can verify the tokens provided by the trusted device 110 and ensure that the trusted device 110 is on the permissioned blockchain 164. In one example, the UEM system 140 can also check the roles of a user associated with the trusted device 110 to ensure that the user is authorized to add new IoT devices.

In an example, verification can include checking the compliance status of the trusted device 110. For example, the management application 120 on the trusted device 110 can gather information about the trusted device 110, such as security settings, installed applications, and its network connection. The management application 120 can send this information to the UEM system 140, and the UEM system 140 can determine whether the trusted device 110 is authorized to add an IoT device 170 based on this information. For example, if the trusted device 110 is outside an authorize geolocation area, or is not physically near the new IoT device 170, the UEM system 140 deny the onboarding request.

At stage 516, the UEM system 140 can send a request to the blockchain consensus 160 to add the new IoT device 170 to the permissioned blockchain 164. In one example, the request can name the trusted device 110 as a trusted referral. The UEM system 140 can also send details about the new user device 130, such as the device ID, any groups the associated user belongs to, and the geolocation of the new user device 130.

At stage 518, the blockchain consensus 160 can add the new IoT device 170 to the permissioned blockchain 164. In an example, the blockchain consensus 160 can include a consensus engine that can receive the request and select a consensus admin device 162 to approve the request. The selected consensus admin device 162 can approve the request, and the new IoT device 170 can be added to the blockchain. In one example, the UEM system 140 can send the request directly to the admin devices 162, either directly or through a network node that receives the request and forwards it to the admin devices 162. The admin devices 162 can add the new IoT device 170 to the permissioned blockchain 164. Each of the admin devices 162 can maintain the ledger so that its authenticity and veracity are decentralized.

At stage 520, the blockchain consensus 160 can notify the UEM system 140 that the new IoT device 170 was added to the permissioned blockchain 164. The UEM system 140 can then send the notification to the non-BC protected edge node 180 at stage 522, which can forward the notification to the new IoT device 170 at stage 524.

At stage 526, the new IoT device 170 can reconfigure its communication protocols to communicate with the UEM system 140 through the BC-protected edge node 190. In one example, the notification received at stage 522 can include network information for connecting to the BC-protected edge node 190.

At stage 528, the new IoT device 170 can communicate through the BC-protected edge node 190. In one example, the BC-protected edge node 190, upon receiving a communication request from the new IoT device 170, can verify that the new IoT device 170 is on the permissioned blockchain 164 before allowing the request to pass through.

In one example of the method described above, the trusted device 110 can be a staging device that is not associated with an authorized user. For example, the trusted device 110 can be a staging device used by a contractor to install new IoT devices on the blockchain secured network 150. In such an example, the staging device can be assigned to an admin user device. The admin device can generate a shared user credential that the staging device can use to onboard IoT devices. In an example, the UEM system 140 can be configured to not allow the staging device to onboard a new IoT device 170 without a referral from an assigned admin device. In one example, the admin device can provide the shared user credential, and any other authentication or security information, to the staging device. The staging device can send this information to the UEM system 140 when adding a new IoT device 170. The UEM system 140 can authenticate the staging device, verify that it is compliant, and verify the assigned admin device. If this is successful, the UEM system can send a request to add the new IoT device 170 to the blockchain consensus 160 with the admin device as a primary referral and the staging device as a secondary referral. This can allow third-party users, like contractors, to securely add IoT devices to the blockchain secured network 150.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for onboarding a new computing device to a secure network, comprising:
receiving, through a non-blockchain protected application programming interface ("API"), a first onboarding request for the new computing device;
receiving, through a blockchain protected API, a second onboarding request for the new computing device, the second onboarding request being received from a trusted device that is registered on a blockchain associated with the secure network;
determining that the first and second onboarding requests are both related to onboarding the new computing device;
authenticating the new computing device; and
sending, to a blockchain consensus, a request to register the new computing device to the blockchain associated with the secure network, wherein the request identifies the trusted device as a referral device.

2. The method of claim 1, further comprising:
receiving, from the blockchain consensus, a notification that the new computing device was successfully registered to the blockchain; and
sending instructions to the new computing device to communicate through the blockchain protected API.

3. The method of claim 1, wherein determining that the first and second onboarding requests are both related to onboarding the new computing device comprises:
comparing a device identifier from both requests, and
determining that the device identifiers match.

4. The method of claim 1, wherein the second onboarding request includes a unique session token provided to the trusted device by the new computing device, a secure token, and a secondary session token.

5. The method of claim 1, wherein the blockchain is a permissioned blockchain that maintains the identity of each blockchain participant on the secure network in a ledger, and wherein the method further comprises adding the new computing device to the blockchain.

6. The method of claim 1, wherein the non-blockchain protected API restricts access to resources on the secure network.

7. The method of claim 1, further comprising authenticating the trusted device using a secure token provided by the trusted device.

8. A non-transitory, computer-readable medium containing instructions that, when executed by a hardware-based processor, performs stages for onboarding a new computing device to a secure network, the stages comprising:
receiving, through a non-blockchain protected application programming interface ("API"), a first onboarding request for the new computing device;
receiving, through a blockchain protected API, a second onboarding request for the new computing device, the second onboarding request being received from a trusted device that is registered on a blockchain associated with the secure network;
determining that the first and second onboarding requests are both related to onboarding the new computing device;
authenticating the new computing device; and
sending, to a blockchain consensus, a request to register the new computing device to the blockchain associated with the secure network, wherein the request identifies the trusted device as a referral device.

9. The non-transitory, computer-readable medium of claim 8, the stages further comprising:

receiving, from the blockchain consensus, a notification that the new computing device was successfully registered to the blockchain; and sending instructions to the new computing device to communicate through the blockchain protected API.

10. The non-transitory, computer-readable medium of claim 8, wherein determining that the first and second onboarding requests are both related to onboarding the new computing device comprises:

comparing a device identifier from both requests, and determining that the device identifiers match.

11. The non-transitory, computer-readable medium of claim 8, wherein the second onboarding request includes a unique session token provided to the trusted device by the new computing device, a secure token, and a secondary session token.

12. The non-transitory, computer-readable medium of claim 8, wherein the blockchain is a permissioned blockchain that maintains the identity of each blockchain participant on the secure network in a ledger, and wherein the method further comprises adding the new computing device to the blockchain.

13. The non-transitory, computer-readable medium of claim 8, wherein the non-blockchain protected API restricts access to resources on the secure network.

14. The non-transitory, computer-readable medium of claim 8, further comprising authenticating the trusted device using a secure token provided by the trusted device.

15. A system for onboarding a new computing device to a secure network, comprising:

a memory storage including a non-transitory, computer-readable medium comprising instructions; and a computing device including a hardware-based processor that executes the instructions to carry out stages comprising:

receiving, through a non-blockchain protected application programming interface ("API"), a first onboarding request for the new computing device;

receiving, through a blockchain protected API, a second onboarding request for the new computing device, the second onboarding request being received from a trusted device that is registered on a blockchain associated with the secure network;

determining that the first and second onboarding requests are both related to onboarding the new computing device;

authenticating the new computing device; and sending, to a blockchain consensus, a request to register the new computing device to the blockchain associated with the secure network, wherein the request identifies the trusted device as a referral device.

16. The system of claim 15, the stages further comprising:

receiving, from the blockchain consensus, a notification that the new computing device was successfully registered to the blockchain; and sending instructions to the new computing device to communicate through the blockchain protected API.

17. The system of claim 15, wherein determining that the first and second onboarding requests are both related to onboarding the new computing device comprises:

comparing a device identifier from both requests, and determining that the device identifiers match.

18. The system of claim 15, wherein the second onboarding request includes a unique session token provided to the trusted device by the new computing device, a secure token, and a secondary session token.

19. The system of claim 15, wherein the blockchain is a permissioned blockchain that maintains the identity of each blockchain participant on the secure network in a ledger, and wherein the method further comprises adding the new computing device to the blockchain.

20. The system of claim 15, wherein the non-blockchain protected API restricts access to resources on the secure network.

* * * * *